United States Patent
Wang (10) Patent No.: US 11,954,924 B2
(45) Date of Patent: Apr. 9, 2024

(54) SYSTEM AND METHOD FOR DETERMINING INFORMATION ABOUT OBJECTS USING MULTIPLE SENSORS

(71) Applicant: ShopperTrak RCT LLC, Chicago, IL (US)

(72) Inventor: Zhiqian Wang, Chicago, IL (US)

(73) Assignee: ShopperTrak RCT LLC, Chicago, IL (US)

( * ) Notice: Subject to any disclaimer, the term of this patent is extended or adjusted under 35 U.S.C. 154(b) by 263 days.

(21) Appl. No.: 17/508,717

(22) Filed: Oct. 22, 2021

(65) Prior Publication Data
US 2022/0129662 A1    Apr. 28, 2022

Related U.S. Application Data (60) Provisional application No. 63/104,676, filed on Oct. 23, 2020.

(51) Int. Cl.
*G06V 20/64* (2022.01)
*G06N 20/00* (2019.01)
*G06V 10/22* (2022.01)

(52) U.S. Cl.
CPC .......... *G06V 20/64* (2022.01); *G06N 20/00* (2019.01); *G06V 10/22* (2022.01)

(58) Field of Classification Search
None
See application file for complete search history.

(56) References Cited

U.S. PATENT DOCUMENTS

| | | | | |
|---|---|---|---|---|
| 7,003,136 B1* | 2/2006 | Harville | ............... | G06V 20/64 |
| | | | | 382/209 |
| 8,385,599 B2* | 2/2013 | Camus | ................... | G06V 20/64 |
| | | | | 382/104 |
| 8,509,523 B2* | 8/2013 | Schamp | ................ | G06V 20/58 |
| | | | | 382/104 |
| 9,836,871 B2* | 12/2017 | Chon | ..................... | G06V 10/48 |
| 10,475,232 B2* | 11/2019 | Chon | ..................... | G06T 17/05 |
| 11,282,291 B1* | 3/2022 | Boardman | ........... | G06T 1/0007 |
| 2004/0153671 A1* | 8/2004 | Schuyler | .................. | G07C 9/28 |
| | | | | 726/9 |
| 2010/0092038 A1* | 4/2010 | Theodore | ............... | G06V 20/64 |
| | | | | 382/103 |
| 2018/0089887 A1* | 3/2018 | Chon | ....................... | G06T 7/33 |
| 2023/0333252 A1* | 10/2023 | Pazhayampallil | ..... | G06V 20/64 |
| 2023/0350415 A1* | 11/2023 | Deyle | ................... | G01S 13/881 |

\* cited by examiner

*Primary Examiner* — Anand P Bhatnagar
(74) *Attorney, Agent, or Firm* — ARENTFOX SCHIFF LLP (57) ABSTRACT

Apparatus and methods for determining information about one or more objects in a 3-dimensional (3D) space are disclosed. One aspect of the method includes defining a virtual ground plane within a monitored 3D space. The virtual ground plane is divided into a plurality of bins. Each bin has corresponding counter value. An object is detected in a respective image captured by each of a plurality of sensors. A respective line segment is selected corresponding to a respective light between each of the plurality of image sensors and the detected object. One or more bins of the virtual ground plane are selected onto which a respective projected line segment of each respective line segment overlap. Each counter value for each of the one or more selected bins is increased. A location of the object is determined based on a bin of the one or more bins having a highest counter value.

16 Claims, 7 Drawing Sheets

SYSTEM AND METHOD FOR DETERMINING INFORMATION ABOUT OBJECTS USING MULTIPLE SENSORS

CROSS-REFERENCE TO RELATED APPLICATIONS

This application claims the benefit of U.S. Provisional Application No. 63/104,676, filed Oct. 23, 2020, which is incorporated herein by reference in its entirety.

TECHNICAL FIELD

The present disclosure generally relates to object detection, tracking, and counting, and more specifically, to system and method for determining information about objects using multiple sensors.

BACKGROUND

In Artificial Intelligence (AI) applications, it becomes increasingly important to accurately determine the location and the height of an object in a 3-Dimensional (3D) space. Such information might be used for further processing, such as identification and categorization of the object. Local image description, including grid-based, is widely used in computer vision, pattern recognition and medical imaging and has served a variety of purposes. Many different descriptors are now available including, but not limited to, Local Binary Pattern (LBP), Scale-Invariant FeaTure (SIFT), Speeded Up Robust FeaTures (SURFT), Histogram of oriented Gradients (HoG), Gradient Location and Orientation Histogram (GLOH) and the like. Depending on the exact application, computational requirements, performance requirements, ease of implementation requirements, etc., different descriptor options may be chosen. The conventional reidentification application method which is powered by a machine learning model (for example, deep neural network) is capable of locating the required object. However, generally, such information is not reliable for the further application or processing.

The inaccurate determination of the location of an object is typically due to the object being viewed or monitored from multiple sensors having multiple viewpoints. Thus, the process of obtaining 3D location of the object is a complicated process because the same object is viewed in multiple frames. Efficient, real-time monitoring and detection of persons, and/or other objects in a wide variety of environments or areas remains challenging since the conventional detection process is focused on detection of the object, rather than detecting the location of the object. The second major challenge is that there is no adequate solution for determining the height of the detected object present in the 3D space.

In view of the foregoing, there is a need for a more accurate approach to performing object detection.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure relates to an object detection system utilizing a plurality of imaging devices having multiple viewpoints. Aspects of the present disclosure employ a virtual grid-based plane divided into a plurality of bins for accurate location determination of the object in an image scene.

One example implementation relates to a method for determining information about one or more objects in a 3-dimensional (3D) space. An aspect of the method includes defining a virtual ground plane within a monitored 3D space. The virtual ground plane is divided into a plurality of bins. Each bin has corresponding counter value. An object is detected in a respective image captured by each of a plurality of sensors. A respective line segment is selected corresponding to a respective light between each of the plurality of image sensors and the detected object. One or more bins of the virtual ground plane are selected onto which a respective projected line segment of each respective line segment overlap. Each counter value for each of the one or more selected bins is increased. A location of the object is determined based on a bin of the one or more bins having a highest counter value.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

As noted above, conventional object detection frameworks continue to struggle with accurate determination of the location of small objects, especially those bunched together with partial occlusions. Typically, various known deep learning based or CNN based single stage networks fail to address this problem due to the lack of the adequate solution for determining the height of the detected object.

A system and method for determining locations and heights of detected objects is disclosed. The system may include a plurality of image sensors and a processor. In an aspect, the system is configured to project segment of the light ray of the detected object on to a line segment on a virtual ground plane. The virtual ground plane is divided into a plurality of bins. Each bin may be used to collect information of the projected light of rays such as counts of rays passing through it. By finding the bin with local maximal count, the system can find the accurate location of the detected objects and can derive the heights of those objects as well.

Figure 1:
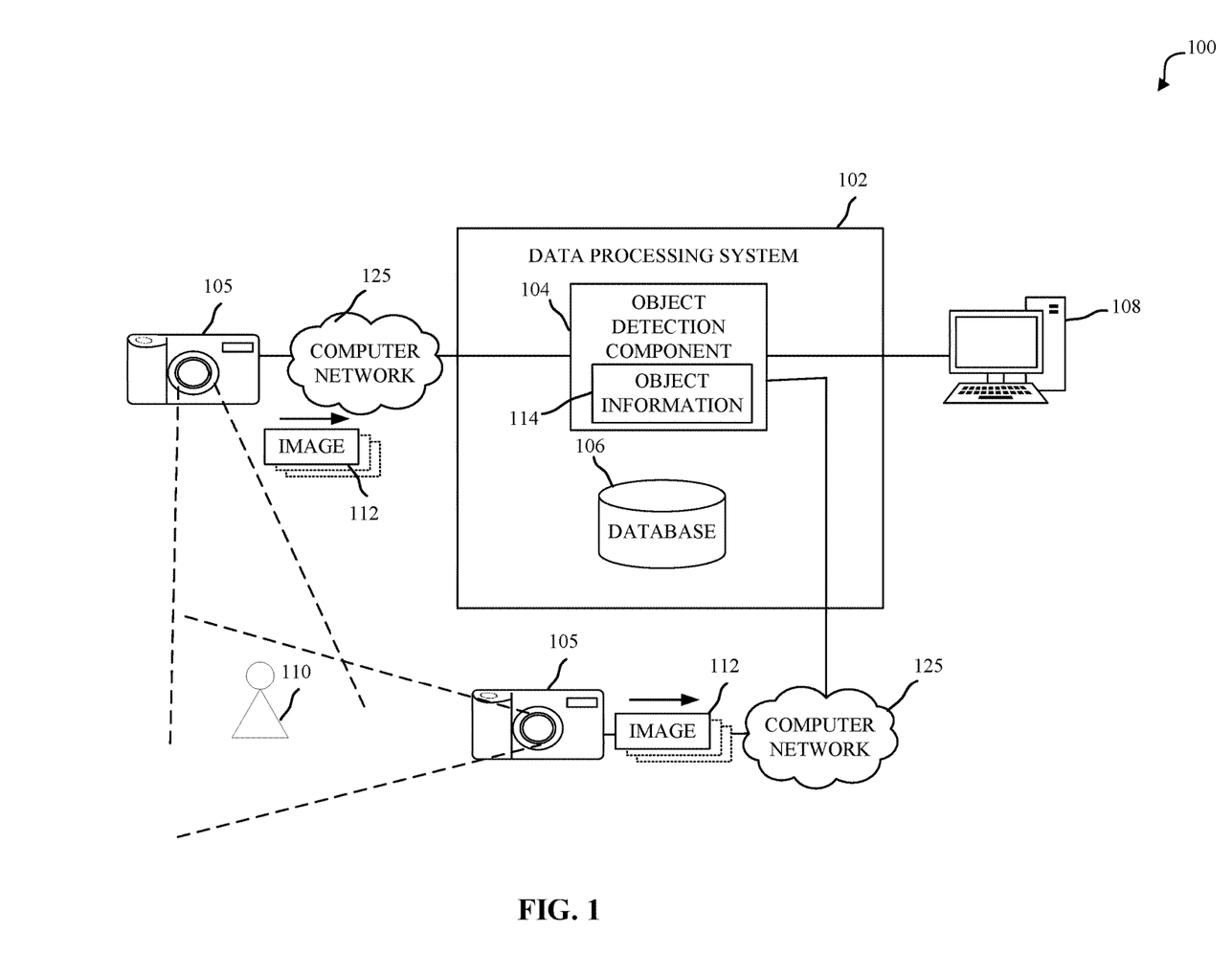
FIG. 1 is a block diagram depicting an example environment for object detection, according to one aspect of the present disclosure.

FIG. 1 illustrates an example image analytics system 100 configured to perform object detection across a plurality of images. The image analytics system 100 can be part of an object detection or tracking system that, for example, identifies or tracks at least one object 110 that appears in multiple different images 112, such as video images and/or still images. The object detection or tracking system can also count detected objects. The system 100 may include one or more image sensors 105, such as but not limited to an optical image sensor, a thermopile, a thermographic image sensor, and/or other computing devices with video or still image creation and/or recording capability.

Each image 112 may include one or more objects 110, which can include background objects or transient objects. The background objects can include generally static or permanent objects that remain in position within the image. For example, the image sensors 105 can be present in a department store and the images created by the image sensors 105 can include background objects such as clothing racks, tables, shelves, walls, floors, fixtures, goods, or other items that generally remain in a fixed location unless disturbed. In an outdoor setting, the images can include, among other things, background objects such as streets, buildings, sidewalks, utility structures, or parked cars. Transient objects can include people, shopping carts, pets, or other objects (e.g., cars, vans, trucks, bicycles, or animals) that can move within or through the field of view of the image sensor 105.

The image sensors 105 can be placed in a variety of public and/or private locations and can generate or record digital images of background or transient objects present within the fields of view of the image sensors 105. For example, a building can have multiple image sensors 105 in different areas of the building, such as different floors, different rooms, different areas of the same room, or surrounding outdoor space. The images 112 recorded by the different image sensors 105 of their respective fields of view can include the same or different transient objects. For example, a first image (recorded by a first image sensor 105) can include a person (e.g., a transient object) passing through the field of view of the first image sensor 105 in a first area of a store. A second image (recorded by a second image sensor 105) may include the same person (e.g., a transient object) passing through the field of view of the second image sensor 105 in a second area of a store. This second area could be overlapping with the first area and/or could be a completely separate area of a store.

The images, which can be video, digital, photographs, film, still, color, black and white, or combinations thereof, can be generated by different image sensors 105 that have different fields of view. The field of view of an image sensor 105 is generally the area through which a detector or sensor of the image sensor 105 can detect light or other electromagnetic radiation to generate an image. For example, the field of view of the image sensor 105 can include the area (or volume) visible in the video or still image when displayed on a display of a computing device. The different fields of view of different image sensors 105 can partially overlap or can be entirely separate from each other.

The system 100 can include a data processing system 102, which can include at least one logic device such as a computing device or server having at least one processor to communicate via at least one computer network 125, for example with the image sensors 105. The computer network 125 can include computer networks such as the internet, local, wide, metro, private, virtual private, or other area networks, intranets, satellite networks, other computer networks such as voice or data mobile phone communication networks, and combinations thereof.

The data processing system 102 can include at least one server or other hardware. For example, the data processing system 102 can include a plurality of servers located in at least one data center or server farm. The data processing system 102 can detect, track, or count various objects that are present in images created by one or more image sensors 105. The data processing system 102 can further include personal computing devices, desktop, laptop, tablet, mobile, smartphone, or other computing devices. The data processing system 102 can determine locations and heights of the objects, or other information about the objects present in the images.

The data processing system 102 can include at least one object detection component 104 and/or at least one database 106 configured to determine an object information 114, including an objection location, and optionally an object height, based on received images of the object from at least two different image sensors 105 according to the techniques described in more detail below with respect to FIGS. 2 to 6. The object detection component 104 can include at least one processing unit, appliance, server, virtual server, circuit, engine, agent, or other logic device such as programmable logic arrays, hardware, software, or hardware and software combinations configured to communicate with the database 106 and with other computing devices (e.g., the image sensors 105, end user computing devices 108 or other computing device) via the computer network 125. The data processing system 102 can be or include a hardware system having at least one processor and memory unit and including the object detection component 104.

Figure 2:
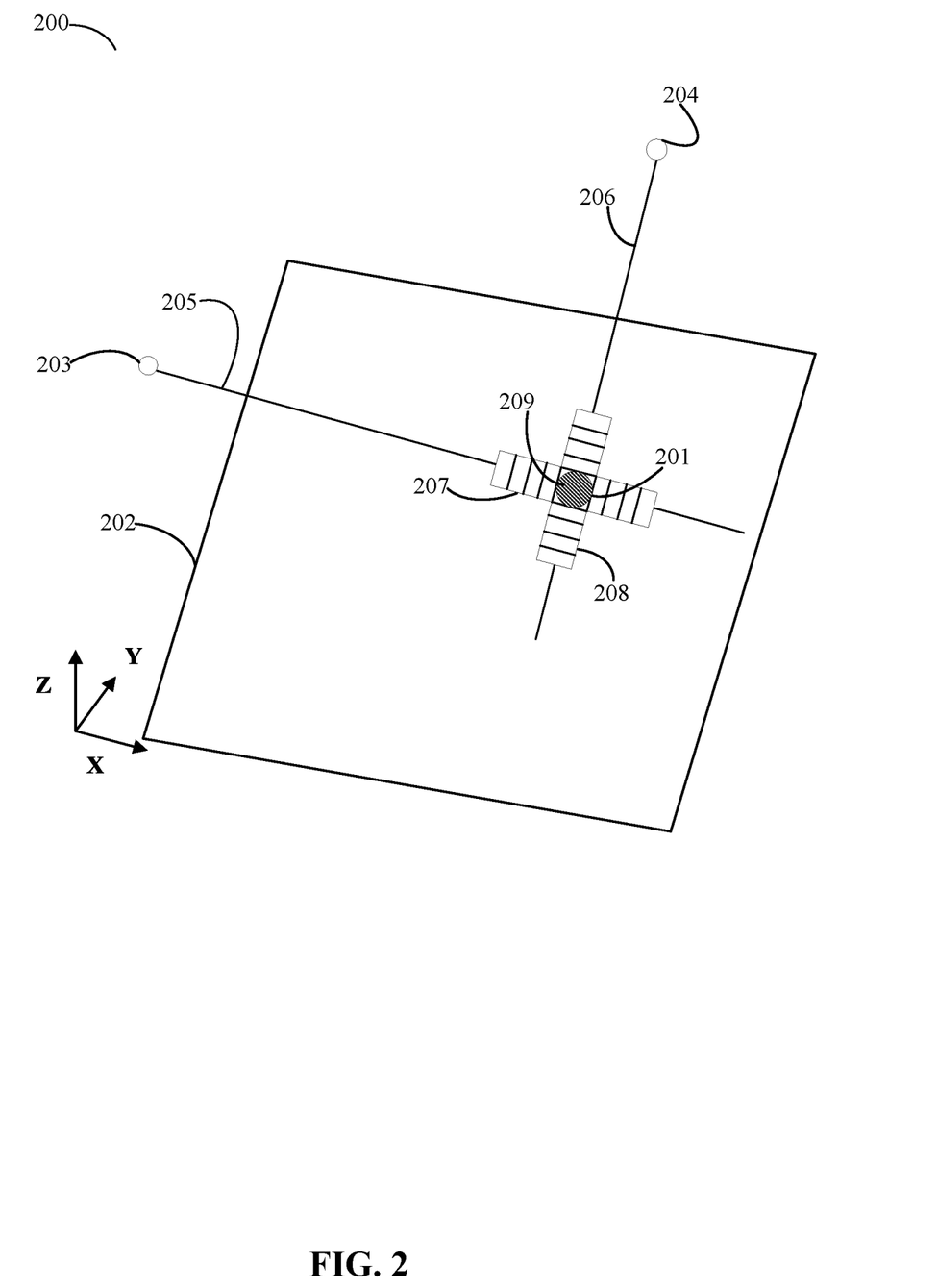
FIG. 2 is a perspective view of an example of light rays being projected onto a virtual ground plane according to a technique that may be used to determine information about the detected object, according to one aspect of the present disclosure.

FIG. 2 illustrates a technique that may be used to determine information about the detected object, such as location and/or height, according to one aspect of the present disclosure. For instance, the described technique may be performed by the data processing system 102 (FIG. 1).

In an aspect, the system 200 may include a virtual ground plane 202 which is further defined by a first axis and second axis. The first axis is an X-axis and the second axis is a Y-axis being perpendicular to the X-axis as shown in FIG. 2. A 3D space is defined by the virtual ground plane 202 along with a Z-axis being perpendicular to the virtual ground plane 202. Thus, the location of an object 201 may be determined by determining the three coordinates (x, y, z).

In an aspect, the object 201 may be viewed or monitored from, for example, two different viewpoints through two different image sensors—a first image sensor 203 and a second image sensor 204, which may be examples of the one or more image sensors 105 of FIG. 1. The first image sensors 203 and the second image sensor 204 may be configured to capture images by capturing light rays of the 3D space.

In an aspect, image calibration of the image sensors may be performed prior to obtaining any images. The image calibration enables accurate determination of angles, positions, and lengths in captured images. Calibration of the first image sensor 203 and the second image sensor 204 may involve the estimation of extrinsic parameters which describe translation and rotation of the second image sensor 204 relative to the first image sensor 203 and intrinsic parameters of each image sensor. Intrinsic parameters may include, but are not limited to, focal lengths, image sensor format, principal points (position of optical center) and other parameters which describe image distortion, such as lens distortion coefficients (k1, k2, k3, k4 and k5). The sensor format may comprise sensor size and sensor pixel size. Image distortion means that image points are displaced from the position predicted by an ideal pinhole projection model. The most common form of distortion is radial distortion, which is inherent in all single-element lenses. Under radial distortion, e.g. pincushion distortion and/or barrel distortion, image points are displaced in a radial direction from the image center. Calibration parameters thus generate stereo disparity that gives three-dimensional world coordinate information, e.g. depth Z that complies with the three-dimensional world coordinate information.

In an aspect, after the calibration process of the first image sensor 203 and the second image sensor 204 is completed, the image points can be described with the implementation of a pinhole projection model. Epipolar geometry is based on the pinhole camera model, a simplified representation of which is shown in FIG. 2. In the pinhole camera model, image sensors are represented by a point. Point 201 represents the point of interest (i.e., an object) in the 3D scene being imaged. Image sensors are generally modeled using the pinhole camera model using perspective projection. This model is a good approximation to the behavior of most real sensors, although in some cases it can be improved by taking non-linear effects (such as radial distortion) into account.

In an aspect, the first image sensor 203 may be configured to capture images of object 201 along the X-axis. The second image sensor 204 may be configured to capture images of object 201 along Y-axis.

In an aspect, the data processing system 102 (FIG. 1) may divide the coordinates of the virtual ground plane 202. For example, the X-Y plane may be divided into any suitable number of segments (bins) with pre-defined (x, y) coordinates from the origin point. Each bin may be defined by a fixed value of (x, y) coordinate which enables to determine the location of the object 201 on the virtual ground plane 202. For example, if the object 201 is present on the bin having coordinates as (5,3) then the object 201 may be present on the virtual ground plane 202 which is 5 units away from the origin along the X-axis and 3 units away from the origin along the Y-axis. The units of measurement may be predefined by the user and may be any one of, but not limited to, millimeters, nanometers, centimeters, meters, and the like. The size of bins may be adjustable depending on various factors.

In an aspect, each bin may be associated with one or more counters that track a count corresponding to a location and/or height associated with a corresponding one or more objects. When the first image sensor 203 and the second image sensor 204 capture an image, the data processing system 102 may access the captured image(s) 112 (FIG. 1) and may employ the object detection component 104 (FIG. 1) to detect at least one object 201 present in the captured images. For example, one category of interest is a person. In various environments, the detection techniques that can be used include, but are not limited to, HoG for detection of objects, deep learned techniques, or other suitable techniques or combinations of techniques. In an aspect, the object detection component 104 may be configured to detect the object using a neural network.

In an aspect, when the object 201 is detected in the captured image, the first image sensor 203 may capture a first light ray 205 of the object 201 and the second image sensor 204 may capture a second light ray 206 from the object 201. The first light ray 205 and the second light ray 206 may be any type of light reflected off of, passing through, or emitted by the object 201 that is capable of being detected by the first and second image sensors 203, 204, respectively. The first light ray 205 may be captured by the first image sensor 203 and the second light ray 206 may be captured by the second image sensor 204 with a particular angle from the object 201. Each image sensor and may implement the light ray tracing rendering technique for generating images. Traditionally, ray tracing is a technique used for high quality, non-real time graphics rendering tasks.

Figure 3:
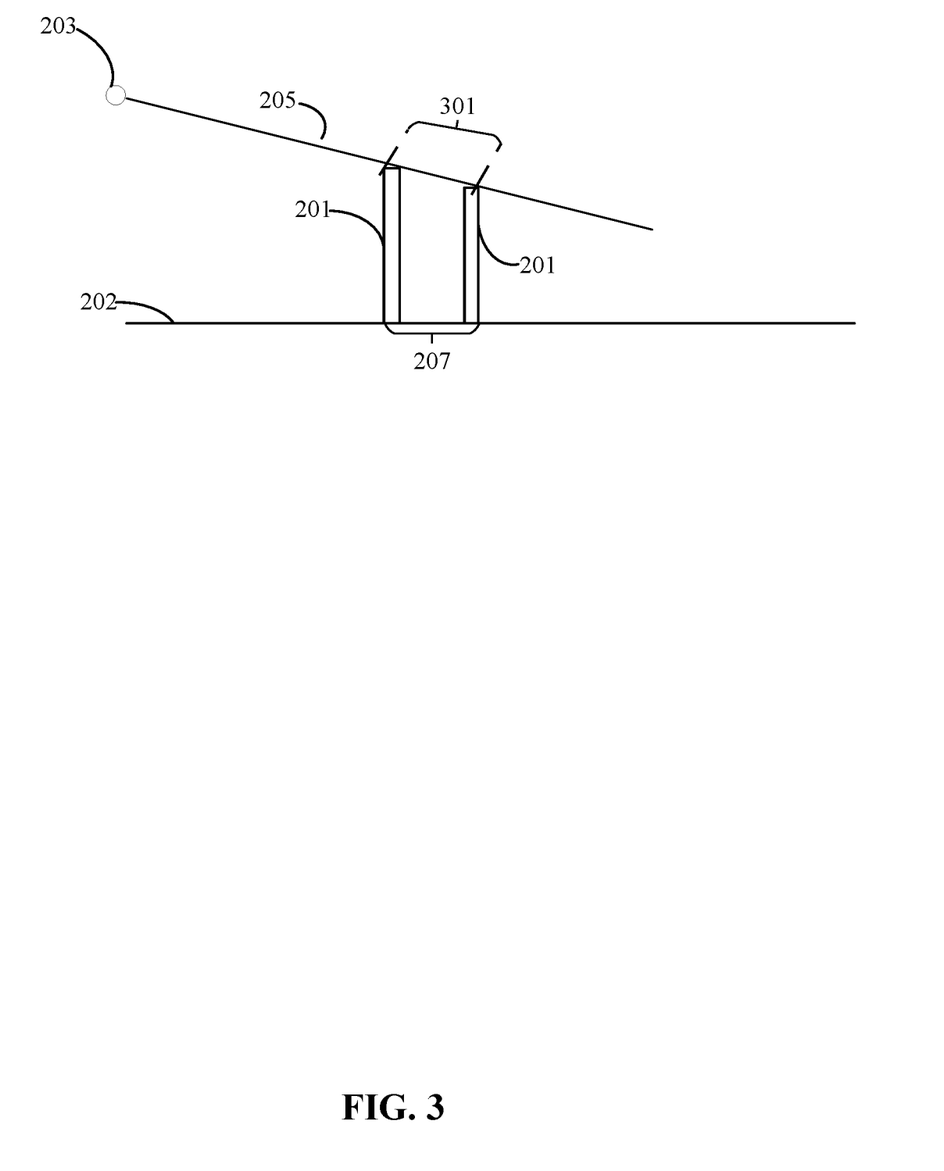
FIG. 3 is a side view of a portion of FIG. 2 that includes one of the light rays and the virtual ground plane, including an example of a projection of a line segment corresponding to the captured light ray onto the virtual ground plane, according to one aspect of the present disclosure.

FIG. 3 illustrates projection of the line segment corresponding to captured light ray 205 on virtual ground plane 202, according to one aspect of the present disclosure. As disclosed above, the first image sensor 203 may be configured to trace the light ray 205 of the detected object 201.

Referring now to both FIG. 2 and FIG. 3, the object detection component 104 may be configured to select a line segment 301 of detected light ray 205 under which the detected object 201 is present. FIG. 3 discloses the line segment 301 which belongs to the light ray 205. In an aspect, the line segment of light ray 205 is selected based on intrinsic and extrinsic parameters of the first image sensor 203 using a neural network, for example. In one non-limiting example, the line segment 205 may be selected based on the known position (i.e., height) of the first image sensor 203 and based on the person's height range. The object detection component 104 may be configured to determine a position of the detected object 201. The object detection component 104 may be further configured to generate, from the position of the projected line segment, a height of the detected object 201. For example, the object detection component 104 may determine the number of bins 207 corresponding to the line segment 205 by projecting the line segment 201 onto the virtual ground plane 202. Similarly, FIG. 2 illustrates the number of bins 208 which are obtained from the projection of corresponding light ray 206 onto the virtual ground plane 202.

In an aspect, the object detection component 104 may increase by 1 (or any predetermined value) a counter value associated with each of the bins 207 and 208 on the virtual ground plane 202 onto which the corresponding to light rays 205 and 206 are projected. The object detection component 104 may select the bin having the maximum counter value in the generated set(s) of bins for determining the position and/or the height of the detected object 201. For instance, in FIG. 2, the bin 209 has the greatest counter value of the intersected sets of obtained bins (207 and 208), and thus may be associated with the position or location of the detected object 201 based on the location of bin 209 in the virtual ground plane 202. In other words, the object detection component 104 may determine the location of the detected object 201 by finding the intersection of rays of light from the detected object 201 to each of the image sensors 203, 204. In an optional additional aspect, in order to determine height of the detected object 201, the object detection component 104 may select the bin having the maximum counter value, e.g., bin 209 in this example, and perform subsequent processing (as described below) to determine a height of the detected object 201. In some implementations, one or more bins having the maximum counter value may be used for subsequent processing of the obtained images, such as by performing an algorithm and/or by processing via a machine learning system.

Though FIG. 2 is shown to have two sets of generated bins (207 and 208) corresponding to a "multi-view" points (viewpoints) onto the detected object 201 obtained by the first image sensor 203 and the second image sensor 204, the present disclosure is not limited to only two sets of generated bins and may comprise any number of sets of generated bins corresponding to multi-view points obtained by any number of image sensors.

In an aspect, the described approach which is implemented by determining the greatest counter value (s) may be applied to a plurality of objects. It should be noted that counter values associated with bins at intersection point(s) will be greater than counter values associated with other bins.

The aspects along with the figures are shown for determining the location and height of a single object for illustrative purpose only. It should be noted that the present disclosure is not limited to determination of locations and heights of only one or specific number of objects and is not limited to a specific number of image sensors. In one aspect, the object detection component 104 may be configured to determine locations and heights of a plurality of objects present in the 3D space.

Figure 4:
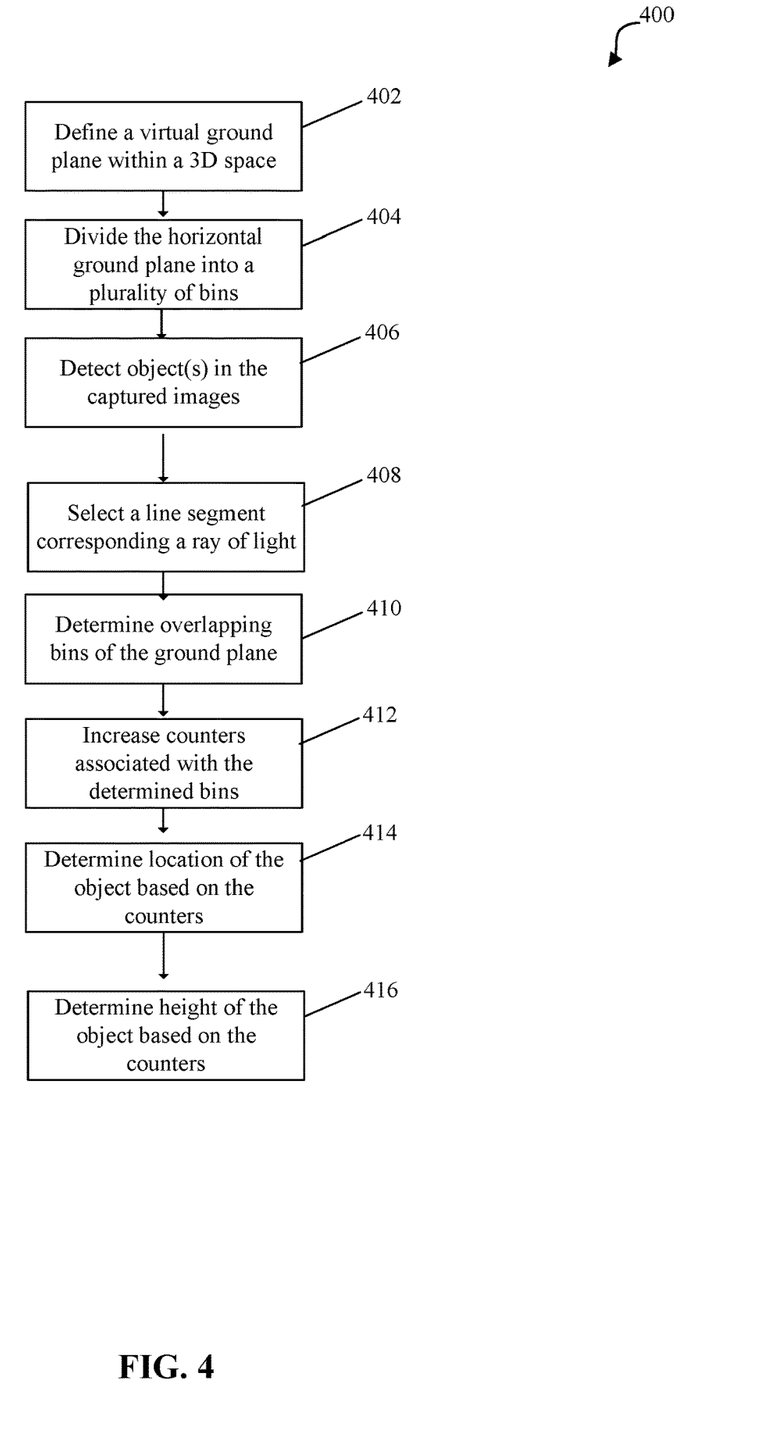
FIG. 4 is an example of a flow diagram of a method for determining information about the detected objects, according to an aspect of the present disclosure.

FIG. 4 is an example of a flow diagram of a method 400 for determining locations and heights of detected objects, according to an aspect of the present disclosure. FIGS. 1-3 and 5-6 may be referenced in combination with the flowchart of FIG. 4. In an aspect, method 400 may be performed by one or more components of system 100 (FIG. 1), such as but not limited to data processing system 102 executing object detection component 104.

To start, method 400 includes two or more image sensors 203, 204 such as a video camera, surveillance camera, still image camera, digital camera, or other computing device (e.g., laptop, tablet, personal digital assistant, or smartphone) with video or still image creation or recording capability.

At step 402, the data processing system 102 may define a virtual ground plane within a monitored 3D space (area of interest), such as the virtual ground plane 202 shown in FIG. 2. A number of images of the monitored area of interest may be captured by the image sensors 203 and 204. In some aspects, the images may be captured and/or acquired by the image sensors 203 and 204 at predetermined image capture intervals.

Figure 6:
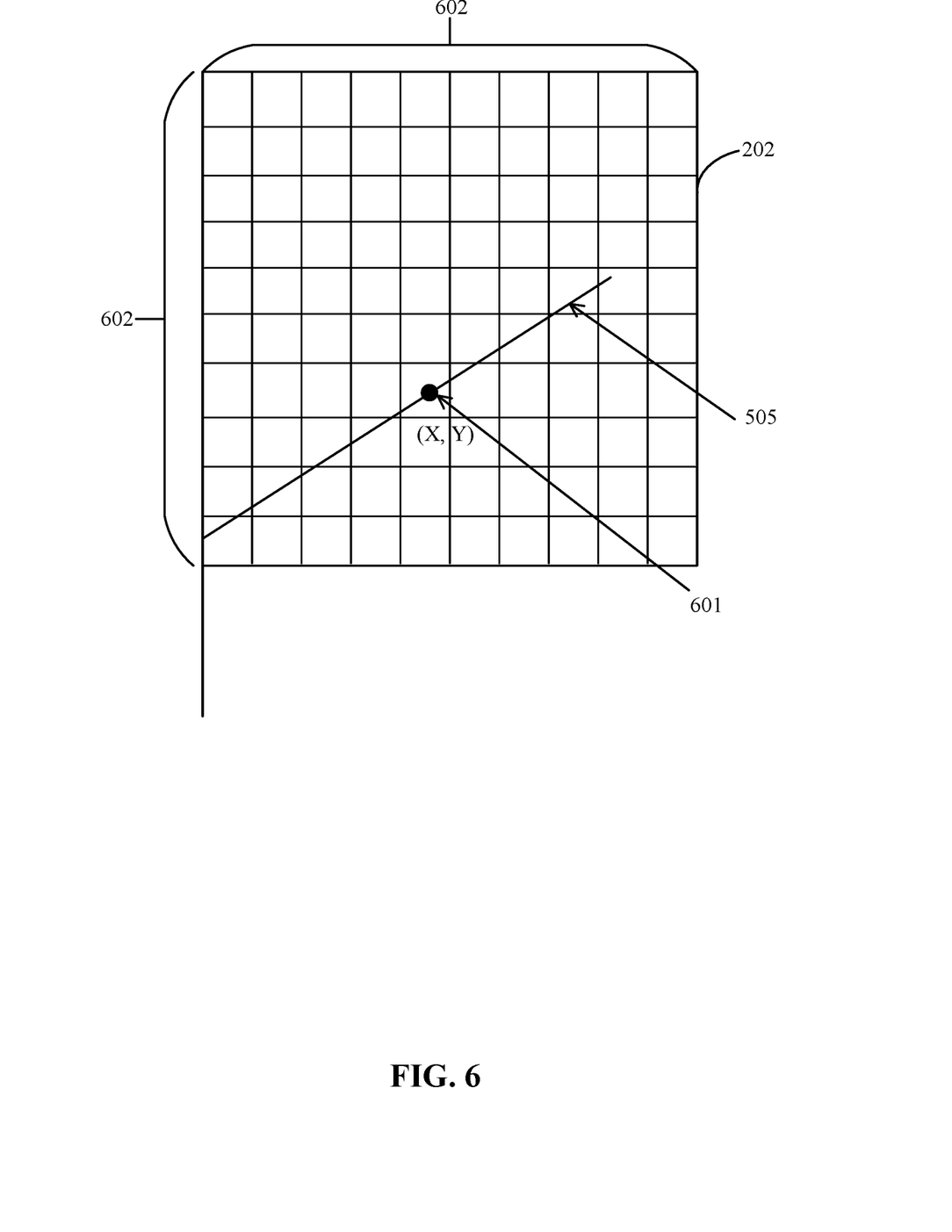
FIG. 6 is a top view of the virtual ground plane, illustrating an example of portion of a technique to determine the height and location of the detected object, according to one aspect of the present disclosure.

In an aspect, at step 404, the data processing system 102 may divide the coordinates of the virtual ground plane 202. The data processing system 102 can divide the virtual ground plane 202 into multiple segments (or bins) and associate counter values taken at the distinct sensing positions corresponding to respective rays of light with the multiple bins. For example, the X-Y ground plane 202 may be divided into any suitable number of bins with pre-defined (x, y) coordinates from the origin point. Each bin may be defined by a fixed value of (x, y) coordinate which enables to determine the location of the object 201 on the virtual ground plane 202. FIG. 6 illustrates an example of a virtual ground plane 202 that has been divided into multiple bins.

At step 406, the object detection component 104 of the data processing system 102 may detect one or more objects 201 in a respective image captured by each of a plurality of sensors 203, 204. The detection techniques that can be used may include, but are not limited to, HOG for detection of objects, deep learned techniques, or other suitable techniques or combinations of techniques. In an aspect, the object detection component 104 may utilize a detection threshold.

At step 408, the object detection component 104 may select respective line segments (and their extensions) of respective light between each of the plurality of image sensors 203, 204 and the detected object 201. FIG. 3 discloses the line segment 301 which corresponds to the light ray 205. In an aspect, the line segment of light ray 205 is selected based on intrinsic and extrinsic parameters of the image sensor 103 and height range of the object 201, for example.

At step 410, the object detection component 104 may determine one or more bins of the virtual ground plane 202 onto which each of the respective line segment overlaps. Thus, the determined bins associated with respective line segments can be represented as a 2D outline of the object 201 projected onto the virtual ground plane 202. For example, in FIG. 2, the bin 209 represents an overlap of bin sets 207 and 208 representing projections of respective line segments.

At step 412, the object detection component 104 may increase counter values for each of the one or more bins determined at step 410. Continuing with the example of FIG. 2, the object detection component 104 may increase counter values associated with the bin 209.

Next, in order to determine location of the detected object 201, the object detection component 104 may select the bin having the maximum counter value (step 414). In some implementations, the bins having maximum counter value may be used for subsequent processing of the obtained images (e.g. by a machine learning system). In FIG. 2, the bin 209 has the maximum counter value and thereby represents the determined location of the detected object 201. In other words, the x, y coordinates of bin 209 in the virtual ground plane 202 may be, or may be correlated to, a geographic position of the detected object 201 in the real world.

Figure 5:
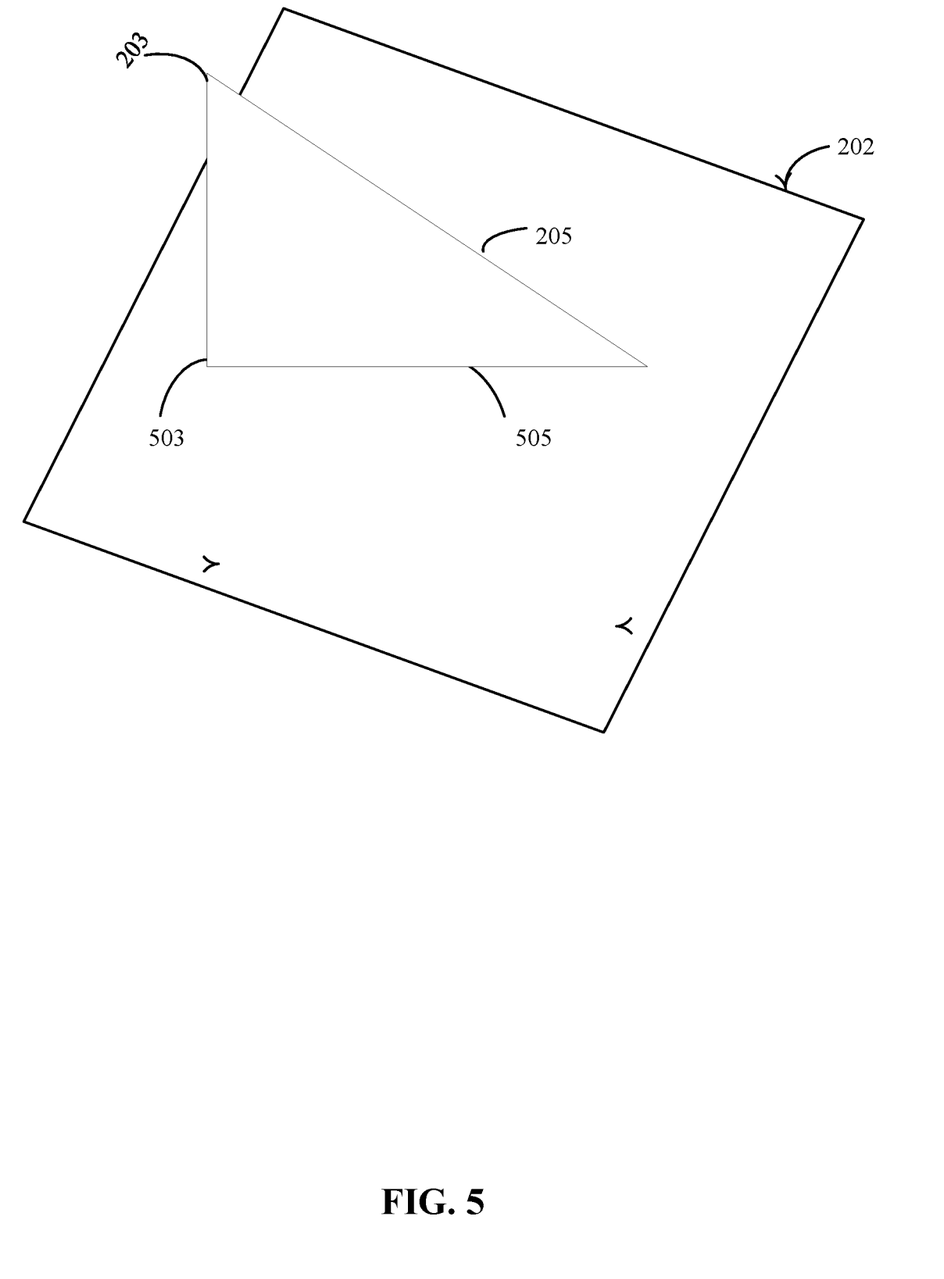
FIG. 5 is a perspective view, similar to FIG. 2, illustrating an example of a portion of a technique to determine the height and location of the detected object, according to one aspect of the present disclosure.

At step 416, the object detection component 104 may calculate a height of the object 201 based on a bin position of the bin having the highest counter value (i.e., bin 209) and a respective sensor position of a respective one of the plurality of sensors 203, 204. FIGS. 5 and 6 illustrate a technique that may be used to determine the height of the detected object by the object detection component 104, according to one aspect of the present disclosure.

In other words, the method 400 includes a method for determining information about one or more objects in a 3-dimensional (3D) space. One aspect of the method includes defining a virtual ground plane within a monitored 3D space. The virtual ground plane is divided into a plurality of bins. Each bin has corresponding counter value. An object is detected in a respective image captured by each of a plurality of sensors. A respective line segment is selected corresponding to a respective light between each of the plurality of image sensors and the detected object. One or more bins of the virtual ground plane are selected onto which a respective projected line segment of each respective line segment overlap. Each counter value for each of the one or more selected bins is increased. A location of the object is determined based on a bin of the one or more bins having a highest counter value.

In one or any combination of these aspects, the method further includes calculating a height of the object based on a bin position of the bin having the highest counter value and a respective sensor position of a respective one of the plurality of sensors.

In one or any combination of these aspects, calculation of the height of the object is further based on a vector representing the respective light ray between the respective one of the plurality of image sensors and the object.

In one or any combination of these aspects, each of the plurality of bins has a bin position including a first coordinate corresponding to a first reference axis of the virtual ground plane and a second coordinate corresponding to a second reference axis of the virtual ground plane. The location of the object corresponds to the bin position of the bin having the highest counter value.

In one or any combination of these aspects, the height of the one or more objects is determined based on at least one of: a plurality of intrinsic parameters of the plurality of image sensors and a plurality of extrinsic parameters of the plurality of image sensors.

In one or any combination of these aspects, the plurality of intrinsic parameters of the plurality of image sensors include one or more of: image sensor focal length, image sensor format, position of optical center of each image sensor, or one or more lens distortion coefficients.

In one or any combination of these aspects, the method further includes calibrating the one or more image sensors with at least one of: the plurality of intrinsic parameters and the plurality of extrinsic parameters.

In one or any combination of these aspects, the line segment is selected based on the intrinsic parameters and the extrinsic parameters of the plurality of image sensors and height range of the detected object.

FIGS. 5 and 6 illustrate a technique that may be used to determine the height of the detected object, according to one aspect of the present disclosure. This technique may include a method of placing a 3D object in a 2D environment. For illustrative purposes only assume that 3D position of the first image sensor 203 has coordinates $(x_o, y_o, z_o)$ and a ray of light can be represented by a vector $(v_{x0}, v_{y0}, v_{z0})$. This ray of light can be characterized in 3D space by formula (1) below:

$$\frac{x - x0}{vx0} = \frac{y - y0}{vy0} = \frac{z - z0}{vz0}$$

Accordingly, projection of the ray of light onto the virtual ground plane 202 may be represented by formula (2):

$$\frac{x - x0}{vx0} = \frac{y - y0}{vy0}$$

FIG. 5 shows a line segment 205 passing through the point representing the first image sensor 203 and intersecting the virtual ground plane 202. Segment 505 illustrates a projection of the line segment 205 onto the virtual ground plane 202. It should be noted that point 503 represents projection of the position of the first image sensor 203 onto the virtual ground plane 202.

FIG. 6 illustrates the virtual ground plane 202 divided into the plurality of bins 602. In FIG. 6, position of the detected object is represented by a point 601 on the projection segment 505. The Z coordinate, z, of the point 601 can be found using the formula (1) above to solve for z, since the x, y location of the detected object is known, and the $x_0$, $y_0$, and $z_0$ information of the image sensor is known. In this particular case the determined z coordinate represent a height of the detected object 201 at position (X, Y). In other words, for any given point of the projected line segment 505, the height can be found using formula (1) by the object detection component 104. In some alternative aspects, after calculating the height, the object detection component 104 may increment a counter associated with the determined height for the bin having coordinates (x,y). In an aspect, for each bin having coordinates (x,y) there could be multiple counter values representing different heights of the detected object 201.

Figure 7:
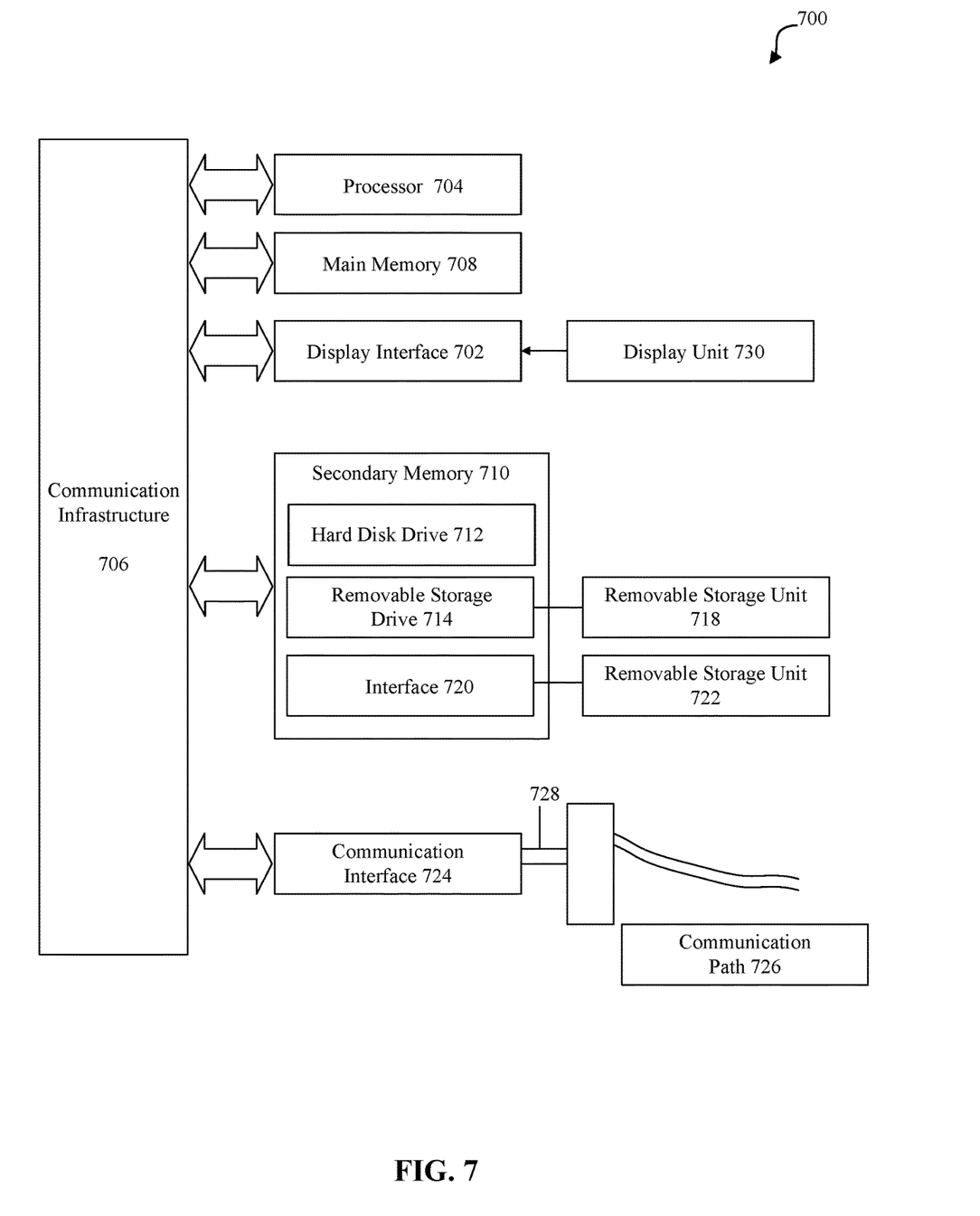
FIG. 7 is a block diagram of various hardware components and other features of a computer system that may enable object detection in accordance with aspects of the present disclosure.

FIG. 7 presents an example system diagram of various hardware components and other features that may be used to perform the aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 704, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 706, such as a bus (or any other use of "bus" herein), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP) among others.

Further, the connection between components of computer system 700, or any other type of connection between computer-related components described herein may be referred to an operable connection, and may include a connection by which entities are operably connected, such that signals, physical communications, and/or logical communications may be sent and/or received. An operable connection may include a physical interface, a data interface and/or an electrical interface.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RANI), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

It should be understood that a memory, as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Aspects of the disclosure are directed to such computer program products.

Computer programs (also referred to as computer control logic) are stored in main memory 708 and/or secondary memory 710. Computer programs may also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software may be stored in a computer program product and loaded into computer system 700 using removable storage drive 714, hard drive 712, or communications interface 720. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for determining information about one or more objects in a 3-dimensional (3D) space, comprising:
    defining, by a processor, a virtual ground plane within a monitored 3D space;
    dividing, by the processor, the virtual ground plane into a plurality of bins, each bin having corresponding counter value;
    detecting, by the processor, an object in a respective image captured by each of a plurality of sensors;
    selecting, by the processor, a respective line segment of a respective light between each of the plurality of image sensors and the object;
    determining, by the processor, one or more bins of the virtual ground plane onto which a respective projected line segment of each respective line segment overlaps;

increasing, by the processor, each counter value for each of the one or more bins; and determining, by the processor, a location of the object corresponding to a bin of the one or more bins having a highest counter value.

2. The method of claim 1, further comprising:

calculating a height of the object based on a bin position of the bin having the highest counter value and a respective sensor position of a respective one of the plurality of sensors.

3. The method of claim 2, wherein calculating the height of the object is further based on a vector representing the respective light ray between the respective one of the plurality of image sensors and the object.

4. The method of claim 1, wherein each of the plurality of bins has a bin position including a first coordinate corresponding to a first reference axis of the virtual ground plane and a second coordinate corresponding to a second reference axis of the virtual ground plane, wherein the location of the object corresponds to the bin position of the bin having the highest counter value.

5. The method of claim 1, wherein the height of the one or more objects is determined based on at least one of: a plurality of intrinsic parameters of the plurality of image sensors and a plurality of extrinsic parameters of the plurality of image sensors.

6. The method of claim 5, wherein the plurality of intrinsic parameters of the plurality of image sensors comprise one or more of: image sensor focal length, image sensor format, position of optical center of each image sensor, or one or more lens distortion coefficients.

7. The method of claim 5, further comprising: calibrating the one or more image sensors with at least one of: the plurality of intrinsic parameters and the plurality of extrinsic parameters.

8. The method of claim 5, wherein the line segment is selected based on the intrinsic parameters and the extrinsic parameters of the plurality of image sensors and height range of the detected object.

9. A system for determining information about one or more objects in a 3-dimensional (3D) space, comprising:

a hardware processor configured to:

define a virtual ground plane within a monitored 3D space;

divide the virtual ground plane into a plurality of bins, each bin having corresponding counter value;

detect an object in a respective image captured by each of a plurality of sensors;

select a respective line segment of a respective light between each of the plurality of image sensors and the object;

determine one or more bins of the virtual ground plane onto which a respective projected line segment of each respective line segment overlaps;

increase each counter value for each of the one or more bins; and determine a location of the object corresponding to a bin of the one or more bins having a highest counter value.

10. The system of claim 9, wherein the hardware processor is further configured to:

calculate a height of the object based on a bin position of the bin having the highest counter value and a respective sensor position of a respective one of the plurality of sensors.

11. The system of claim 10, wherein the hardware processor configured to calculate the height of the object is further configured to calculate the height based on a vector representing the respective light ray between the respective one of the plurality of image sensors and the object.

12. The system of claim 9, wherein each of the plurality of bins has a bin position including a first coordinate corresponding to a first reference axis of the virtual ground plane and a second coordinate corresponding to a second reference axis of the virtual ground plane, wherein the location of the object corresponds to the bin position of the bin having the highest counter value.

13. The system of claim 9, wherein the height of the one or more objects is determined based on at least one of: a plurality of intrinsic parameters of the plurality of image sensors and a plurality of extrinsic parameters of the plurality of image sensors.

14. The system of claim 13, wherein the plurality of intrinsic parameters of the plurality of image sensors comprise one or more of: image sensor focal length, image sensor format, position of optical center of each image sensor, or one or more lens distortion coefficients.

15. The system of claim 13, wherein the hardware processor is further configured to: calibrate the one or more image sensors with at least one of: the plurality of intrinsic parameters and the plurality of extrinsic parameters.

16. The system of claim 13, wherein the hardware processor is configured to select the line segment based on the intrinsic parameters and the extrinsic parameters of the plurality of image sensors and height range of the detected object.

* * * * *